July 28, 1959
G. A. TINNERMAN
2,897,465
ASSEMBLY RETAINERS
Filed July 27, 1955
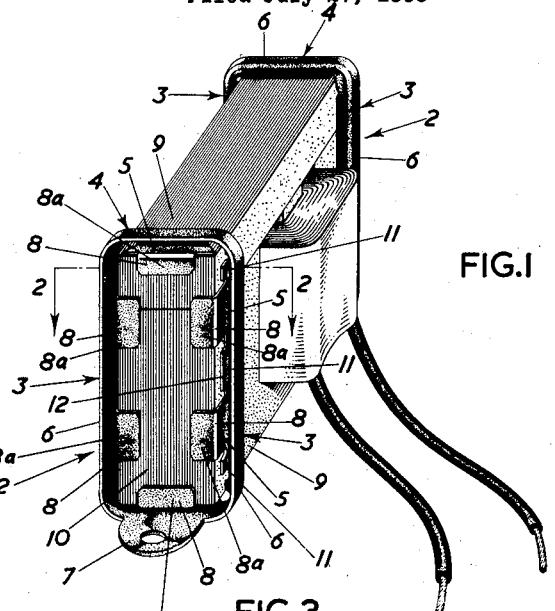
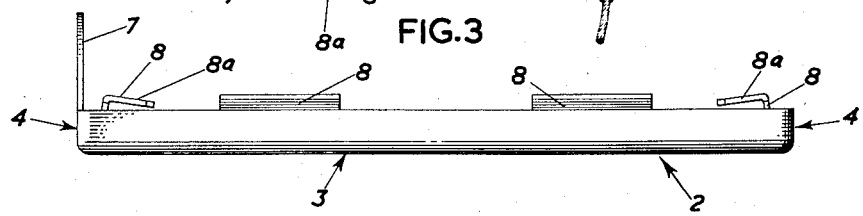
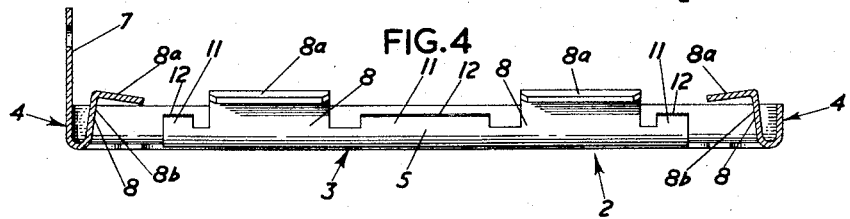
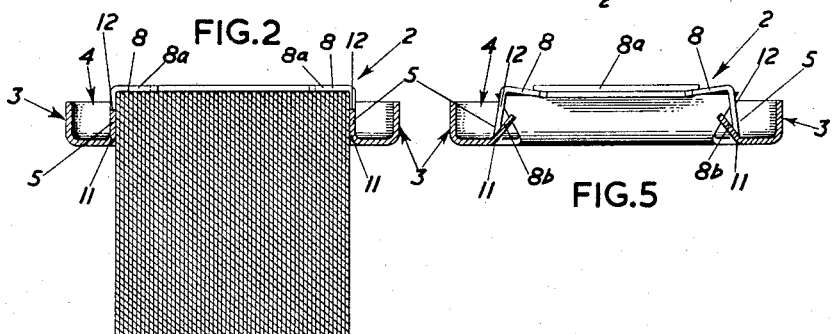
Inventor
GEORGE A. TINNERMAN.
By Featherstonhaugh & Co.
Atty's.

United States Patent Office 2,897,465
Patented July 28, 1959

2,897,465

ASSEMBLY RETAINERS

George A. Tinnerman, Lakewood, Ohio

Application July 27, 1955, Serial No. 524,663

1 Claim. (Cl. 336—210)

This invention relates to a self-energizing retainer for securing and/or mounting a component or components of products, produced for the electrical industry.

The invention will be illustrated with particular reference to its use in retaining side by side laminations in compression in electrical transformers, in combination with a mounting function, if desired, and most useful for application to the type of relatively small transformer as, for example, those used in audio and/or fluorescent lighting equipment.

It has been found that where laminated components are secured in assembled relation in the electrical industry, certain pressures and gaps or spacings must be exactly maintained in order to prevent disturbance of the electromagnetic field generated by this component, or components. Heretofore, extraneous means in the form of outside mechanical force, such as bolts and the like, have been necessary to provide for this exactitude, along with separate holders and mounting means, and which do not lend themselves to automatic assembly, commonly referred to as "automation," which is of prime importance having regard to manufacturing methods of the present time. Moreover, the only practical holding means that have been found usable are composed of silicon steels which, because of their composition, are most difficult to form and/or cut with the resultant requirement of frequent sharpening and maintenance of fabricating tools.

The present invention eliminates these disadvantages in a very simple manner and provides a development through which necessary pressures and gaps, etc. are readily maintained and which lends itself to automation in production.

The main object of the invention is to devise a simple self-energizing retainer in the form of a frame proportioned to embrace a plurality of surfaces of a component or components, the frame carrying tongues arranged resiliently to engage the contacted faces of the component or components and thereby to securely engage and hold them.

A further object of the invention is to provide a device of this kind in which the retainer incorporates mounting means as an integral element thereof to perform the dual function of retaining and mounting by means of one simple unit.

A further object of the invention is to so devise the retainer frame and its tongues that several of the tongues resiliently engage both the side faces and end face of the assembly and whereby the engagement of such tongues with the end of the assembly not only holds the retainer against inward movement along the assembly from its adjusted position thereon, but serves to locate said plates in registry.

Another object of the invention is to provide several tongues apart from the assembly compressing and assembly end engaging tongues and which are arranged to press against the sides of the assembly transversely of the laminations whereby the free end edges of the tongues bite to a slight degree into the outer faces of the outer laminations to hold the retainer frame against outward sliding movement along the assembly and to also assist in compressing the laminations together.

A further and particular object of the invention is to devise a retainer consisting of an integral body formed of substantially resilient sheet material and comprising a component, or lamination assembly embracing frame and from which the integral resilient assembly engaging tongues project.

With the foregoing and other objects in view as shall appear, the invention comprises a retainer formed and arranged all as hereinafter more particularly described, and illustrated in the accompanying drawing, in which:

Fig. 1 is a perspective view of an audio transformer showing the laminations pressed together in assembly by a pair of retainers.

Fig. 2 is an enlarged cross-sectional view through one of the retainers and a fragmentary portion of the assembly embraced thereby, being taken through the line 2—2, Fig. 1.

Fig. 3 is an enlarged side view of the retainer apart from the lamination assembly.

Fig. 4 is a longitudinal cross-sectional view through the retainer as shown in Fig. 3; and Fig. 5 is a transverse cross-sectional view through the retainer as shown in Fig. 3.

The retainer is preferably integrally stamped from substantially resilient material, such as thin spring sheet steel, and comprises a rectangular lamination assembly embracing frame carrying integral lamination assembly engaging tongues. Through the use of this material, resilience is obtained where needed for locking results and it is capable of being so formed as to provide rigidity where solid mounting and retaining means are necessary.

To provide strength and rigidity such frame 2 is formed with channel shaped sides and ends 3 and 4, the inner and outer walls 5 and 6 of the channels being arranged substantially at right angles to the plane of the frame whereby the outer faces of the inner walls extend alongside the sides of an embraced lamination assembly. In the type of retainer illustrated, the outer channel wall of one end of the retainer carries an integral mounting lug 7.

The retainer frame is proportioned to tightly embrace the lamination assembly for which it is proportionally designed, the assembly engaging tongues defining portions of the inner frame walls 5. The frame carries two sets of tongues, the tongues 8 of one set being each of substantially L-shape and arranged to engage the four sides 9 and one end face 10 of the assembly when the retainer is in position thereon, and whereby the retainer is held against inward movement along the assembly from its adjusted position through the engagement of the bent outer ends 8a of the tongues with the assembly end face 10.

The second set of tongues 11 are inclined inwardly of the frame to a slight degree and are carried upon two opposite sides of the frame for engagement with the outer faces of the two outside faces of the assembly. When the retainer frame is positioned upon a lamination assembly, the inclinations of the tongues 11 cause the tongues to assist in compressing the laminations and also directs their free end edges 12 to bite to a slight degree into the two faces of the assembly and thus hold the retained frame against outward movement along the assembly from its adjusted position thereon. As will be seen in Fig. 1, a retainer is generally positioned upon each end of a lamination assembly.

Referring to Figs. 4 and 5, the inner portions 8b of the tongues are inclined inwardly of the frame to a slight degree whereby such portions will resiliently produce the lamination assembly compressing pressure. It will be also seen that before the retainer frame is positioned upon an assembly, the bent outer ends 8a of the tongues are also inclined inwardly so that inward movement of the retainer frame upon an assembly will cause such ends 8a in their pressure against the assembly end face 10 to be pressed in an outward direction against their resilience whereby such pressure increases the locking action of tongues 11 biting into the faces of the assembly.

It will be apparent that the retainer frame may be placed in final position upon a lamination assembly in a single movement, and when so positioned will, through the medium of its assembly engaging tongues, tightly retain the laminations in compression in such a manner to provide a contact between all laminated sections of the transformer and retain the frame against movement thereon.

What I claim as my invention is:

A retainer for embracing and retaining a pluraliy of components incorporated in an electrical transformer or the like comprising a substantially rectilinear open frame of channel formation having upstanding interior and exterior flanges forming the channel, said frame being formed of substantially resilient sheet material proportioned to encircle and closely to embrace four exterior surfaces of said assembly in pressure contact, said frame having elements rising from directly opposed portions of the interior flange thereof formed with offset free ends, said elements being inclined inwardly towards the opening thereof, said free ends thereof being offset substantially at right angles thereto and being inclined to the plane of the frame towards said opening to engage in pressure contact a fifth surface of said assembly disposed substantially perpendicular to said other surfaces and designed to locate said frame at a predetermined point on said assembly, and resilient tongues of less height than said elements rising from said interior flange of said channel frame and inclined inwardly to overlie said opening in said frame, said tongues having free edges capable of engaging at least two of said first mentioned exterior surfaces opposed to one another, said edges of said tongues being capable of biting into said opposed surfaces to maintain said frame against retraction from said predetermined located position on said assembly.

References Cited in the file of this patent

UNITED STATES PATENTS

| | | |
|---|---|---|
| 2,494,350 | Mittermaier | Jan. 10, 1950 |
| 2,563,105 | Epstein | Aug. 7, 1951 |

FOREIGN PATENTS

| | | |
|---|---|---|
| 669,296 | Great Britain | Apr. 2, 1952 |